United States Patent [19]

Ekhaus

[11] Patent Number: 5,675,550
[45] Date of Patent: Oct. 7, 1997

[54] REDUCED WAVENUMBER SYNTHETIC APERTURE

[76] Inventor: Ira B. Ekhaus, 100 Wildwood Ave., Arlington, Mass. 02174

[21] Appl. No.: 658,336

[22] Filed: Jun. 5, 1996

Related U.S. Application Data

[60] Provisional application No.60/005,183 Jun. 8, 1995.
[51] Int. Cl.$^6$ .................................................. G01S 15/00
[52] U.S. Cl. ........................... 367/7; 367/88; 342/179; 342/25
[58] Field of Search ................... 342/179, 25; 367/88, 367/7; 128/660.07; 73/603; 364/413.22, 413.2, 413.25

[56] References Cited

U.S. PATENT DOCUMENTS

| | | | |
|---|---|---|---|
| 4,088,978 | 5/1978 | Gilmour | 367/88 |
| 4,717,916 | 1/1988 | Adams et al. | 367/8 |
| 4,987,563 | 1/1991 | Gilmour | 367/88 |
| 5,170,170 | 12/1992 | Soumekh | 342/179 |
| 5,200,931 | 4/1993 | Kosalos et al. | 367/88 |
| 5,295,118 | 3/1994 | Gilmour | 367/88 |
| 5,412,618 | 5/1995 | Gilmour | 367/88 |

*Primary Examiner*—Daniel T. Pihulic
*Attorney, Agent, or Firm*—Sprung Kramer Schaefer & Briscoe

[57] ABSTRACT

A system for radiation imaging of objects within a target area utilizing echo signals from a target area such as a patch of seafloor or the anatomy of a body. Data is obtained by time domain measurements received at a plurality of transducers in either monostatic or bistatic mode. Using multidimensional interferometry and multidimensional Fourier transforms, the data is reconstructed in multiple temporal and spatial frequency domains with a unique reduced wavenumber characteristic that retains the resolution potential of a traditional synthetic aperture approach. The system is inherently robust in applications with significant transceiver motion and/or variations in the propagation characteristics of the surrounding medium.

12 Claims, 11 Drawing Sheets

```
┌─────────────────────────────────────────────┐
│ MEASURE ECHOED SIGNALS IN TEMPORAL          │
│ DOMAIN (CONTINUOUS) AND DISCRETE            │
│ SPATIAL DOMAINS: $u$ (SPATIAL TRANSLA-      │
│ TION) AND (IF BISTATIC) $\nu$ (SPATIAL LAG).│
│                                          32 │
└─────────────────────────────────────────────┘
                      │
                      ▼
┌─────────────────────────────────────────────┐
│ BAND PASS FILTER, $H(w)$                    │
│                                          34 │
└─────────────────────────────────────────────┘
                      │
                      ▼
┌─────────────────────────────────────────────┐
│ TIME VARYING GAIN SYNCHRONIZED              │
│ WITH PULSE TRANSMISSION                     │
│                                          33 │
└─────────────────────────────────────────────┘
                      │
                      ▼
┌─────────────────────────────────────────────┐
│ COHERENT DETECTION, BASEBAND TO             │
│ LOWPASS CONVERSION AND SAMPLING             │
│ (A/D CONVERSION) IN TEMPORAL DO-            │
│ MAIN.                                    35 │
└─────────────────────────────────────────────┘
                      │ $s(t, u, \nu)$
                      ▼
┌─────────────────────────────────────────────┐
│ TEMPORAL   FOURIER   TRANSFORM              │
│ $t \rightarrow \omega$                      │
│                                          36 │
└─────────────────────────────────────────────┘
                      │ $s(\omega, u, \nu)$
                      ▼
```

FIG. 3

REDUCED WAVENUMBER SYNTHETIC APERTURE

Applicant hereby claims the benefit under 35 USC § 119(e) of U.S. provisional application Ser. No. 60/005,183 filed Jun. 8, 1995.

FIELD OF THE INVENTION

This invention relates to radiation imaging wherein the radiation is sonic (ie acoustic or ultrasonic) or electromagnetic radiation and the imaging is echo imaging, i.e., where radiation is directed toward a plurality of objects (target region) within the propagating medium, and reflected radiation is received and analyzed to create an image, and more particularly to an improved system for processing echo signals to obtain accurate images of a target region using transforms and conversions that includes a reduced wavenumber synthetic aperture (REWSA) technique that anticipates measurement scenarios with significant transceiver motion and variations in the propagation characteristics of the surrounding medium.

BACKGROUND OF THE INVENTION

Imaging systems fall into the major categories of real aperture, synthetic aperture and interferometric along with other nonlinear techniques. Real aperture systems (RA) designs incorporate a narrow combined transmit/receive beam to provide adequate resolution for the final image output, while synthetic aperture systems (SA) exploit data received over a plurality of transceiver (combined transmitter and receiver) positions and, due to the broader transmit beams of a SA system, require additional processing to achieve finer resolution.

Real Beam Systems

In real aperture imaging systems such as B-scan medical ultrasound and side-scan sonar systems, resolution is proportional to the product of beamwidth and range, and hence inversely proportional to the aperture that can be deployed. In medical ultrasound, transceiver aperture comes at the expense of increased patient discomfort and risk to the point of impractibility, while real aperture in side-scan sonar systems is achieved by increasing system size.

Moreover, all real aperture systems embody a tradeoff between the desirable but mutually exclusive performance characteristics of high coverage rate and fine resolution—the finer the scans that an image of target region is comprised of the more scans are required and the longer it takes to generate an the image. This tradeoff is especially acute in acoustic imaging applications due to the relatively slow propagation speed of acoustic waves (compared to electromagnetic propagation).

Multi-Beam

A design improvement for real aperture systems involves a multi-beam mode such as the MSFS, a multi-scan focused sonar system manufactured by Klein Associates (Salem, N.H.), in which individual transmissions (with broader beams than single beam systems) are received by plurality of receive elements at the transceiver, and by processing means primarily comprised of digital beamforming of the elements' signals, subdivided into several finer scans. Contingent on the quality and quantity of beams formed from multiple receive elements, the coverage rate tradeoff can be improved by a factor equal to the number of beams. However, the final resolution is still limited by the real aperture of the system which is now dominated by the dimension of the receive array. Aside from a poor coverage/resolution tradeoff characteristic, all real beam systems (multi-beam included) have the additional inherent drawback that the resolution varies with range—significantly compromising post-processing efforts such as image based detection.

Interferometric Processing

Interferometric processing primarily involves the measurement of the pairwise phase difference of echoes received across a plurality of receivers. This phase difference, along with the pairwise sensor distance and operating wavelength, can be used to estimate the relative angle between the line to the target (based at the midpoint between sensors) and the interferometric broadside (normal to the line between sensors parallel to the eikonal of the radiated energy). This methodology is most often considered a target tracking scheme, but it is possible, given a certain of conditions to form an image from interferometric data.

A sonar imaging system such as (James G. Kosalos, U.S. Pat No. 5,200,931 issued Apr. 6, 1993) cites the use of interferometry as a method and apparatus for the generation of a three-dimensional image representing structures detected within a volume, from two dimensional differential phase measurements made on backscatter signals. Kosalos defines an approach wherein interferometric measurements of azimuth and elevation, along with echo time delay, provide estimates of volumetric scatterer position which are input to a histogram processor. This approach does not provide a formal method for coherently combining echoes over several returns. Another interferometric system (G. W. Adams, U.S. Pat No. 4,717,916, issued Jan. 5, 1988) cites the use of interferometry of the sampled and complex base-banded signals from a plurality of receivers. Adams teaches the use of pairwise receiver phase comparison over two frequencies, and the use of an arcsine processing stage to develop estimates of the zenith of the target.

Both Adams and Kosalos (nor any other known prior art) discuss the issues of coherent spatial wavenumber processing, fine scale motion compensation and, most importantly, a means by which the spatially varying cross target interference terms (a key feature of interferometric processing) are either modeled or successfully inverted to minimize artifacts that can be interpreted as false targets.

In fact, performing a Fourier Transform on the complex conjugate (interferometric) product $$s\left(x+\frac{v}{2}\right)s^*\left(x-\frac{v}{2}\right)$$

over a spatial lag variable $v$, $$W(x,k_v) = \int s\left(x+\frac{v}{2}\right)s^*\left(x-\frac{v}{2}\right) E[j\,vk_v]dv. \qquad (1)$$

yields the definition of a Wigner function of the spatial field, operating on $s(x)$ where $x$ and $v$ are the spatial and spatial lag variables respectively. While there is an extensive literature base that covers almost every conceivable analytic and practical feature of the Wigner transform and other Time/Frequency representations, the present invention of Reduced Wavenumber Synthetic Aperture (REWSA), exploits the mathematics of Time/Frequency signal representations in a unique system design to robustly inverted from the wavenumber database to the final image.

Synthetic Aperture and Acoustic Imaging

To improve the tradeoff between resolution and aperture size of real beam systems, methods by which the multiple echoes are coherently combined are inevitably suggested; this is essentially Synthetic Aperture. Synthetic aperture (SA) imaging systems that employ transforms and other signal manipulations based on spatial frequency (wavenumber) quantities are well known in the prior art. Publications such as (Mehrdad Soumekh , U.S. Pat No. 5,170,170, issued Dec. 8, 1992) teach the use of these manipulations. While synthetic aperture arrays have been used in certain radar systems, and methodologies such as taught by Soumekh can achieve the highest possible performance by performing several critical calculations in the wavenumber domain without traditional approximations, it has been long known that the applicability of synthetic aperture techniques to certain measurement scenarios and propagation mediums is severely limited. These applications include but are not limited to, underwater acoustic imaging (sonar) and ultrasonic imaging of body tissue.

A review of the prior art has not found any existing underwater acoustic imaging (synthetic aperture sonar) system that can reliably overcome the combination of variations in transceiver position and the propagation characteristics of shallow water acoustic propagation. Many previous efforts either ignore or underestimate the difficult signal processing issues that the underwater medium imposes on a system (i.e. (George A. Gilmour , U.S. Pat No. 4,088,978 issued May 9, 1978) and (George A. Gilmour, U.S. Pat No. 5,295,118 issued Mar. 15, 1994)). Proposed design innovations to mitigate these effects include coherent sub-apertures and data dependent autofocusing, but successful operational systems have not been fielded. The situation is essentially the same in medical ultrasound imaging, where systems have not reliably overcome the combination of variations in transceiver position and the propagation characteristics of the body of tissue in the role of an acoustic propagation medium.

Since the first successful synthetic aperture systems were deployed in the early 60's, the gap has widened between SA technology as applied to electromagnetic propagation (radar applications) and that of acoustic imaging applications. The key impediment is that, in many applications, a realistic acoustic environment invalidates the theoretical assumptions that traditional SA techniques are based on. The present invention addresses the shortcomings of prior efforts in synthetic aperture sonar through a thorough reexamination of the signal model along with the derivation of a new class of algorithms.

SUMMARY OF THE INVENTION

It is a feature of the invention to provide a system which obtains accurate and high resolution images from echo signals from a target region received at a combination of real and synthetic aperture and exhibits improved performance against the operational challenges of significant transceiver motion and variations in the propagation characteristics of the surrounding medium.

It is another feature of the invention to provide an echo signal processor, especially one which provides a synthetic aperture system for underwater acoustic applications such as a side scan synthetic aperture sonar remote sensing system. It is another feature of the invention to provide a synthetic aperture system, which is especially useful in diagnostic medicine, for imaging as target regions, portions of human anatomy that are partially enclosed in body structure, which processor transforms the detected signals into signals form which accurate displays of the target region are obtained.

It has been discovered in accordance with the present invention that previous state of the art synthetic aperture methodologies (such as Soumekh) have, through the use of a correcting phase function for a two dimensional dataset (t and u) that models a spherical propagating wave, along with the necessary multi-dimensional Fourier inversion procedures, embedded an extreme sensitivity to the position reference $(X_1, Y_1)$ implicit in the phase function $$E[j2k \sqrt{(X_1-x_i)^2 + (Y_1+u_i-y)^2}] \tag{2}$$

where $k=\omega/C$ is the wavenumber (radians per meter), C is the speed of propagation in the medium surrounding the target, $(X_1, Y_1+u_i)$, $i=1, \ldots N$ are the coordinates of the i-th transceiver position; $u_i$ takes on values in $[-L,L]$, a line in the y direction along which the transceiver is displaced at positions $u_i$, $i=1, \ldots M$ (synthesized aperture); $(X_1, Y_1)$ are the coordinates of the element at the center of the synthetic array (midpoint on the vertical line); the target is centered around the origin; i.e., (0,0); $\sqrt{(X_1-x_i)^2+(Y_1+u_i-y)^2}$ is the distance from a reflector at the coordinates (x,y) in the target region to the element located at $(X_1, Y_1+u_i)$. The phase function of equation 2 makes clear that system sensitivity to variations in transceiver position $(X_1)$ across the aperture are "seen" at approximately twice the propagating wavenumber through the resulting argument to the complex exponential $E[j2k( )]$.

For example, consider a sonar system operating at 100 KHz, with a wavenumber of approximately k~400 experiencing a residual (after correction) transceiver position error $\Delta_{x_1}=X_1-\hat{X}_1$. Assuming $\Delta_{x_1}$ is a zero mean Gaussian random variable with RMS$(\Delta_{x_1})$=0.001 m, $\Delta_{x_1}$ imposes a residual phase error term $$E[j2k\Delta_{x_1}] = E\left[j\frac{800}{1000}\zeta\right]$$

($\zeta$, being a zero mean, unit variance Gaussian random variable) which essentially randomizes the phase across the synthesize aperture u. To mitigate the effects of this phase randomization, motion compensation techniques strive to measure the absolute position of the transceiver to accuracies well within a wavelength such that RMS$(2k\Delta_{x_1})\ll 1$. This tolerance has not been achieved in operational sonar systems. Moreover, sound speed fluctuations within the propagating medium that vary across the synthetic aperture impose a randomized phase component on the final inversion that is, in some scenarios, more severe than the residual motion error.

Reduced Wavenumber Synthetic Aperture (REWSA)

A unique characteristic of the present invention is a reduced sensitivity to these motion sensitivities, hence Reduced Wavenumber Synthetic Aperture (REWSA). The present invention, as in the prior art mentioned above, operates by detecting radiation (echo signals) from the object at a plurality of spaced apart locations to provide echo signal data and transforms that data to obtain information which can be plotted to create an image of the object. By the reconstruction of the data in the frequency and multiple spatial frequency domains, REWSA provides data which, when transformed into the spatial three-dimensional domain $(k_x, k_u, k_v)$ domain, creates information which, when inversely transformed, can be plotted to provide an accurate high resolution image even in the presence of significant variations in unmodeled transceiver position and propagation characteristics, along with scenarios where the effects of Fresnel or plane wave approximations diminish resolution performance.

More specifically, radiation reflected or emitted from the object is received at a plurality of locations relative to the object through a combination of physical and synthetic apertures. The radiation data, defined on multiple temporal (t,τ) and spatial (u,υ) scales, is transformed into multiple temporal and spatial frequency domains through processing means that include complex phase corrections, Fourier transforms of single or several dimensions, and interpolations.

Time (t) in this presentation, refers to delay time w.r.t. the start of an individual transmission pulse and is often referred to as "fast time" or time of flight (due to its direct relation to propagation time). A discussion of the temporal lag variable (τ) is deferred to the detailed description of the present invention. Time on the scale of the pulse to pulse delay or "slow time" relates to variations in the characteristics of the propagating medium and along with the transceiver translation velocity defines the spatial grid $u_i$ on which echoes are recorded. The spatial lag dimension, υ, and the processing stages that exploit it, are a unique innovation of the present invention. This additional data dimension υ, can be formed by a re-mapping of data on the original $u_i$ grid, or measure directly as part of a bistatic system design through the use of a set of receive elements whose combined data set (a data volume of $(t,u_i,v_j)$) are all available for subsequent processing. By assigning the υ data dimension the role of an interferometric aperture, formal Time/Frequency mathematical techniques are now accessible for modeling and inversion of the multiple temporal/spatial frequency database to the final image.

BRIEF DESCRIPTION OF DRAWINGS

FIG. 3 shows the initial measurement and signal conditioning steps of the present invention.

DETAILED DESCRIPTION OF THE INVENTION

The operating principles and benefits of the present invention of Reduced Wavenumber Synthetic Aperture, REWSA, are best introduced by a review of linear wavenumber synthetic aperture SA techniques . This methodology can be summarized as follows:

1. Define a signal model that relates the measurement spectra to the target plane spectra.

2. Define geometric induced phase functions that accurately represent the spherical propagating wave nature and correct for them.

3. Invert the relation to estimate the target plane spectra from the measurement spectra.

4. Interpolate the target plane spectra to an even grid in the spatial domain.

5. Invert the 2D spatial Fourier Transform the target plane transform to obtain the final image.

System Hardware

FIG. 3 describes the front end signal flow of an imaging system conforming to the present invention. The signal conditioning steps will be describe in the sequel, but it should be noted that the present invention involves a "front end" consisting of transducers and analog signal conditioning electronics, digitizers and a host system comprising a plurality of processors such as an Intel Pentium PC, along with a set of specialized DSP boards (ie Bittware (Concord, N.H.)) using Analog Devices (Norwood, Mass.) SHARC DSP chips to perform the FFT operations.

Linear Synthetic Aperture signal model

Figure 1:
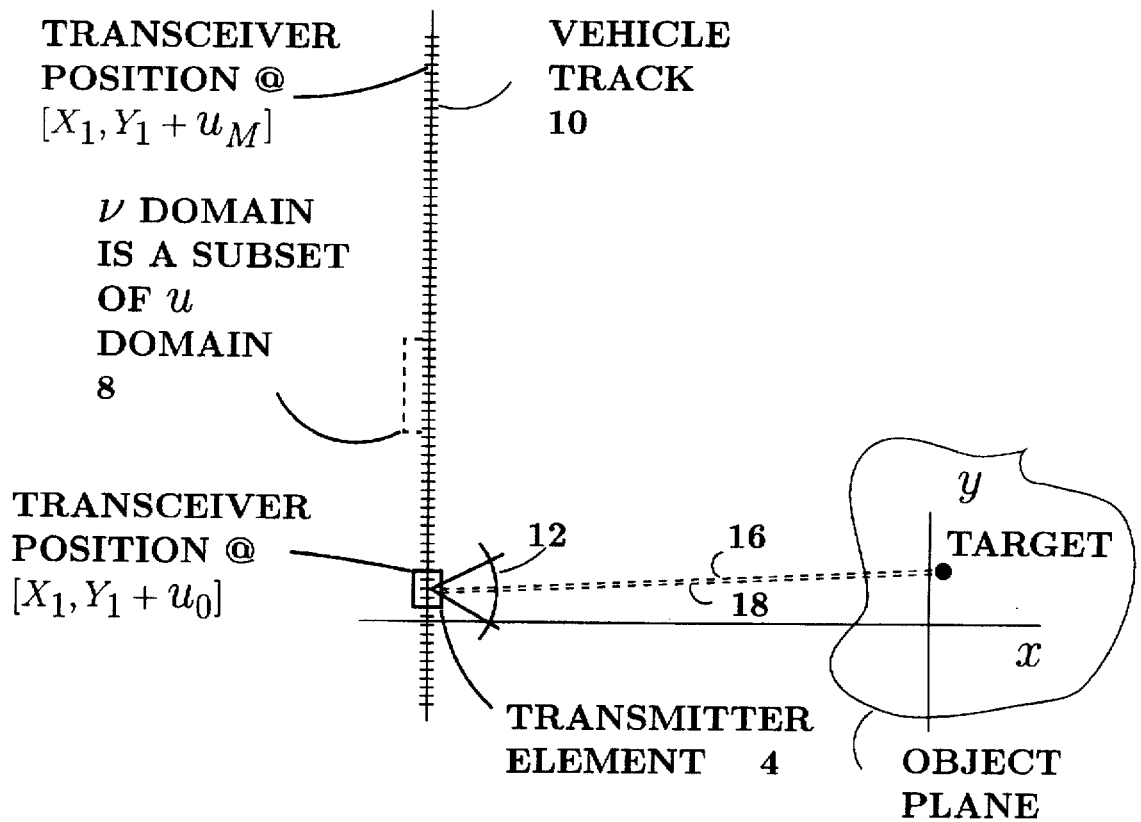
FIG. 1 shows a typical monostatic measurement scenario of the present invention.

Consider a two-dimensional imaging system comprised of a transceiver (transmit and receive elements) 4 traversing a track 10 at position $u_i, 0 \leq i \leq M$. The system operates in a mono-static measurement scenario (FIG. 1), with reflectivity function of the target field $\alpha(x,y)$ a function of Cartesian grid (x,y) (Without loss of generality, the mapping between the 3D slant range plane and the 2D image plane is deferred). For the mono-static case, the acoustic paths [transmitter/object] 16 and [object/receiver] 18 are drawn as essentially the same.

The 2D spatial spectra is defined as position in the target plane with spatial wavenumbers $k_x, k_y$ and whose spatial transform, denoted by $\Psi(k_x, k_y)$ is defined as $$\Psi(k_x,k_y) = \int_x \int_y \alpha(x,y) E[-jk_x x] E[-jk_y y] dx dy. \qquad (3)$$

The target or object area is illuminated by the transmitted signal and lays within a disk of radius $X_o$ centered at the origin in the spatial domain (x,y). The wavenumber of a wave with temporal frequency ω traveling in this medium is defined as k=w/c. The transmitted signal is multi-frequency such as a FM chirp or short duration pulse with beam pattern 12 that determines the subset of $u_i$ wherein the target within the object plane is illuminated (ensonified).

Received signals are obtained as echoes from the objects within the target plane, by appropriate signal conditioning and sampling procedures on the receive elements as shown in FIG. 3. Assuming that the additional REWSA data dimension of υ can be viewed as a hidden parameter, then a REWSA processor operates on the same raw data as traditional SA system designs; the signal conditioning path ("front end") is then defined as:

measurement (FIG. 3, step 32):

Radiation reflected from objects are measured at a plurality of receive transducers.

bandpass filter (FIG. 3, step 34):

Noise that is out of band (w.r.t. the signal) is filtered in the temporal frequency ω domain. This function involves analog filters with transfer function H(w) with the typically desirable characteristics of a flat pass band, linear group delay within band and strong out of band rejection. While these properties are to some extent mutually exclusive, design methodologies are part of the standard literature and not part of the scope of the innovation of the present invention.

Time varying gain (FIG. 3, step 33):

a gain step that corrects for the two way (transmit/receive) spherical propagation loss $1/R^2$ for a target at range R from the transceiver. This step substantially preserving dynamic range by countering the effect of range on signal amplitude, allowing the A/D step to sample signals with greater precision that would otherwise be possible.

A/D sampling (FIG. 3, item 35):

This step involves measuring the suitably conditioned analog voltage, with an analog to digital converter at an appropriate sampling rate. Often the bandwidth of the signal is only a small portion of the nominal center or carrier frequency. In this case instead of requiring that the sampling frequency $f_s$ be at least twice the highest frequency component of the analog signal, $f_s$ can be specified as a sub-multiple of the carrier frequency. While this deliberate under-sampling of the analog signal is now the preferred approach to sampling an analog signal with a carrier, an equivalent design would include a coherent detector that provides in-phase and quadrature components that can be digitized to provide the sampled complex baseband signal (as discussed in "Detection, Estimation and Modulation Theory, Part III" by "H. L. Van Trees", John Wiley and Sons, 1971, New York)

The received signal, a sum of all echoes from objects within the target region as a function of along track position u and echo delay ("fast time") t is defined as:

$$s(t,u) \equiv \iint \alpha(x,y) p \left[ t - \frac{2|[X_1 - x, Y_1 + u - y]|}{C} \right] dxdy \quad (4)$$

where [0,0] is the center of the target image plane (FIG. 1), and the differential area dxdy contribute reflected energy proportional to $\alpha(x,y)$ the target reflectivity function at target point [x,y], delayed by twice acoustic path between the transceiver at $[X_1, Y_1]$ and target point. The transmission signal p(t) and received signals s(u,t) are complex baseband signals.

Wavenumber Characterization of Linear SA

Next, the temporal Fourier transform (FT) t→ω is computed with the conventions defined in the standard literature as $$s(\omega,u) = P(w) \iint \alpha(x,y) E[-j2k \sqrt{(X_1-x)^2 + (Y_1+u-y)^2}] dxdy. \quad (5)$$

where the wavenumber k and spatial variables $x,y,X_1,Y_1,u$ have been previously defined. The implementation of this temporal FT (FIG. 3, step 36) is discrete and typically performed using the well known FFT algorithm. However, the continuous domain more clearly presents the algorithmic steps, and will be used in the sequel.

The complex exponential $$\Phi_{pf} = E[-j2k \sqrt{(X_1-x)^2 + (Y_1+u-y)^2}] \quad (6)$$

is interpreted as the spherical wave due to the reflection from a point scatterer position at [x,y] illuminated (ensonified) by a transmitter at $[X_1, Y_1]$ and can be restated as a sum of plane waves $$\Phi_{pf} = \int_{-2k}^{2k} \frac{1}{\sqrt{4k^2 - k_u^2}} E[-jk_x(X_1 - x) + jk_u(Y_1 + u - y)] dk_u \quad (7)$$

where the relation between the measurement wavenumbers and the target plane wavenumbers is $$k_x = \sqrt{4k^2 - k_u^2} \quad (8)$$

$$k_y = k_u$$

and in order to simplify the following presentation, we focus on the phase functions and suppress the amplitude function $$\frac{1}{\sqrt{4k^2 - k_u^2}}. \quad (9)$$

Incorporating equation 7 into equation 5 yields $$s(\omega,u) = P(w) \int_{-2k}^{2k} E[-j2k_x X_1 + jk_u Y_1] E[jk_u u] \quad (10)$$
$$* \underbrace{\iint \alpha(x,y) E[-j(k_x x + k_u y)] dxdy}_{\text{Two dimensional Fourier integral}} dk_u$$

$$= P(w) \int_{-2k}^{2k} E[-j(k_x X_1 + k_u Y_1)] \Psi(k_x, k_u) E[(jk_u u)] dk_u$$

This is an important result, in that the measurement spectra is now related to the target plane spectra linearly, without requiring approximations to the phase function of equation 6. The wavefront decomposition formulation of SA techniques is a complete theoretical tie-in to tomography.

Computing the spatial Fourier Transform $u \to k_u$ of $s(\omega,u)$ yields the algebraic relation between the measurement spectrum $S(k_u, w)$ and target reflectivity spectrum $\Psi(.)$ as $$S(\omega, k_u) = P(w) E[jk_x X_1 + jk_u Y_1] \Psi(k_x(w, k_u), k_u), \quad (11)$$

where variables $u/k_u$ are the along track offset/wavenumber pair, $k_w$ is the propagating wavelength at frequency w, $x/k_x$ is the across track range/wavenumber pair ($k_x$ satisfying equation 8), $X_1$ is the nominal across track range to target, and $Y_1$ is the along track offset of the target. Equation 11 is then inverted to provide an estimate of $\Psi(k_x, k_u)$ as $$\hat{\Psi}(k_x(\omega,k_u),k_u) = P^{-1}(\omega) \underbrace{E[-jk_x X_1 - jk_u Y_1] S(\omega,k_u)}_{\text{phase function}}. \quad (12)$$

However, in order to perform the final spatial FT inversion, it is necessary to re-interpolate $\Psi(k_x, k_u)$ from an even grid w.r.t. ω but uneven w.r.t. $k_x$, to an even grid on $k_x$ base on the original data grid ($k_x(\omega, k_u)$). Since the wavenumber mapping relations of 8 define a one to one relation between $k_x$ and ω at a given value of $k_u$, the interpolation is straightforward, and a simple 2D inverse spatial FT can be applied to yield an estimate of the target plane image as $$\hat{\alpha}(x,y) = |FT^{-1}[\Psi(k_x, k_y)]| \quad (13)$$

where the notation | | is the absolute value operator.

Motion Compensation Sensitivities of Linear SA

In actuality, the transceiver position $[X_1, Y_1]$ undergoes perturbations during measurement and is more accurately describe by $[X_1 + X_1(u), Y_1]$. In this case $s(\omega,u)$, as defined by equation 5, depends on a phase function $$E[-j2k\sqrt{(X_1+X_1(u)-x)^2+(Y_1+u-y)^2}\ ]\quad(14)$$

that explicitly varies with u, and the correction for this factor must be introduced before the spatial Fourier Transform $u \to k_u$ of $s(\omega,u)$.

Correcting for any spectral emphasis by pre-multiplying by $P^{-1}(w)$, leaves $$S_\omega(\omega,u) = \int \alpha(x,y) E[-j2k\sqrt{(X_1+X_1(u)-x)^2+(Y_1+u-y)^2}\ ]dxdy, \quad(15)$$

where the subscript $(\ )_\omega$ marks the spectral flattening, and multiplying by the motion compensation phase factor $$\Phi_m^{\ 1}(u,\omega) = E[j2k\sqrt{(X_1+\hat{X}_1(u))^2+(Y_1+u)^2}\ ]\quad(16)$$

yields $$S_{m\omega}(\omega,u) = \quad(17)$$

$$\Phi_m(u,\omega)\int\int\alpha(x,y)E[-j2k\sqrt{(X_1+X_1(u)-x)^2+(Y_1+u-y)^2}\ ]dxdy$$

or posed as an inverse FT of $S(k_u,\omega)$.

$$S_{m\omega}(\omega,u) = \quad(18)$$

$$\Phi_m(u,\omega)\int_{-2k}^{2k} E[-j(k_x(X_1+X_1(u))+k_uY_1)]\Psi(k_x,k_u)E[(jk_uu)]\,dk_u,$$

where the subscript $(\ )_{mw}$ now marks both spectral flattening and motion compensation.

An alternative motion compensation step inserts the correcting phase function $$\Phi_m^{\ 2}(u,k_x,\omega) = E[jk_x(X_1+\hat{X}_1(u))]\quad(19)$$

within the $u \to k_u$ spatial Fourier Transform of $s(\omega,u)$ yielding $$\begin{aligned}S_{m\omega}(\omega,k'_u) &= \int du E[-juk'_u]\Phi_m^{\ 2}(u,k'_x,\omega)\{dk_u\Psi(k_x,k_u)E[(jk_uu)]\\&\quad E[-j(k_x(X_1+X_1(u))+k_uY_1)]\\&= \int du\int dk_u\Psi(k_x,k_u)E[j(k_x(X_1+X(u))-k'_x(X_1+\hat{X}(u))]\\&\quad E[-jk_uY_1]E[ju(k_u-k'_u)]\\&= \int dk_u\Psi(k_x,k_u)E[jX_1(k_x-k'_x)]\\&\quad E[-jk_uY_1]\int du E[(k_xX_b-k'_x\hat{X}_b)]E[ju(k_u-k'_u)]\end{aligned}\quad(20)$$

where $k'_u$ is a dummy variable and $k'_x$ satisfies $k'_x = \sqrt{4k^2-k'^2_u}$. If $X(u)$ is a constant bias $X_b$ and not a function of u, then $$\begin{aligned}S_{m\omega}(\omega,k'_u) &= \Psi(k_x,k_x)E[jk'_x(X_b-\hat{X}_b)]E[j(k'_uY_1)]\\&= \Psi(k_x,k'_u)E[jk'_x\Delta_{x_1}]E[j(k'_uY_1)]\end{aligned}\quad(21)$$

where the residual position error is defined as $$\Delta_{x_1} = X_b - \hat{X}_b. \quad(22)$$

While a full statistical analysis of a system's output must be based on equation 20, for the purpose of demonstrating the advantages of the present invention, equation 21 provides a simple wavenumber relation between motion compensation and complex phase factor. An important point to remember is that phase function for motion compensation can be introduced at a variety of points in the processing chain and with varying degrees of precision, depending on the application.

Now, correcting for squint offset $Y_1$ yields $$\Psi_{m\omega}(k_x(\omega,k_u),k_u) = E[jk_x\Delta_{x_1}]S_{m\omega}(k_x,\omega)\quad(23)$$

where the subscript $\Psi_{mw}$ emphasizes the spectral flattening $(P^{-1}(w))$, and motion compensation correction. Depending on the exact definition of the motion compensation step, step 46 of FIG. 4) could be composed entirely of a squint correction, or could embody additional corrections to reposition the image at the correct position in the cartesian plane.

It is seen that primary difference between equations 11 and 23 is the complex exponential $E[jk_x\Delta_{x_1}]$, a residual phase error that cannot be removed.

If we define a requirement for phase coherence as limiting the RMS of the argument to this complex exponential to less than $\pi/4$, then this requires $$\Delta_{x_1} < \frac{\pi}{4k_x}\quad(24)$$

For a sonar system operating at 100 KHz, with wavenumber k~400, this translates to a limit of $$RMS(\Delta_{x_1}) < \frac{\pi}{4*2*400} \sim 1\text{ mm}.\quad(25)$$

Figure 6:
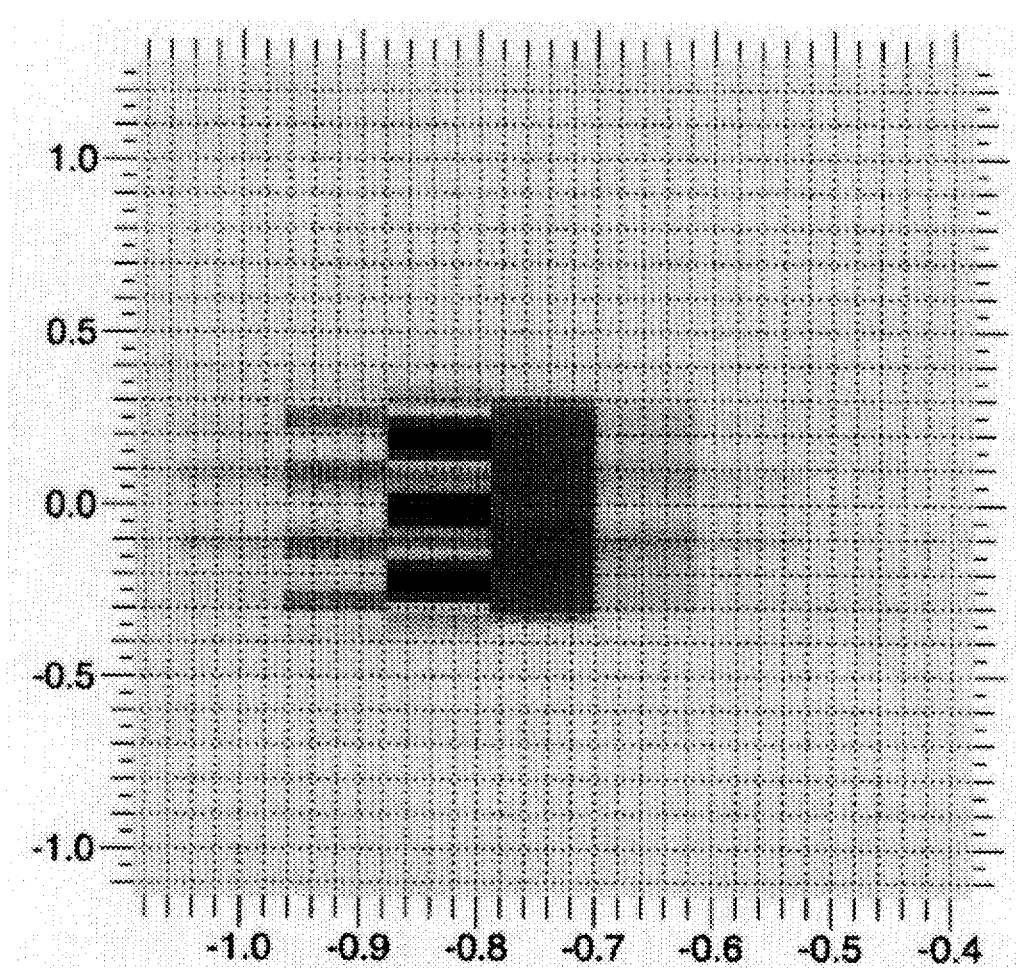
FIG. 6 shows an image formed by traditional linear SA for the case of idealized, zero residual motion error.
Figure 7:
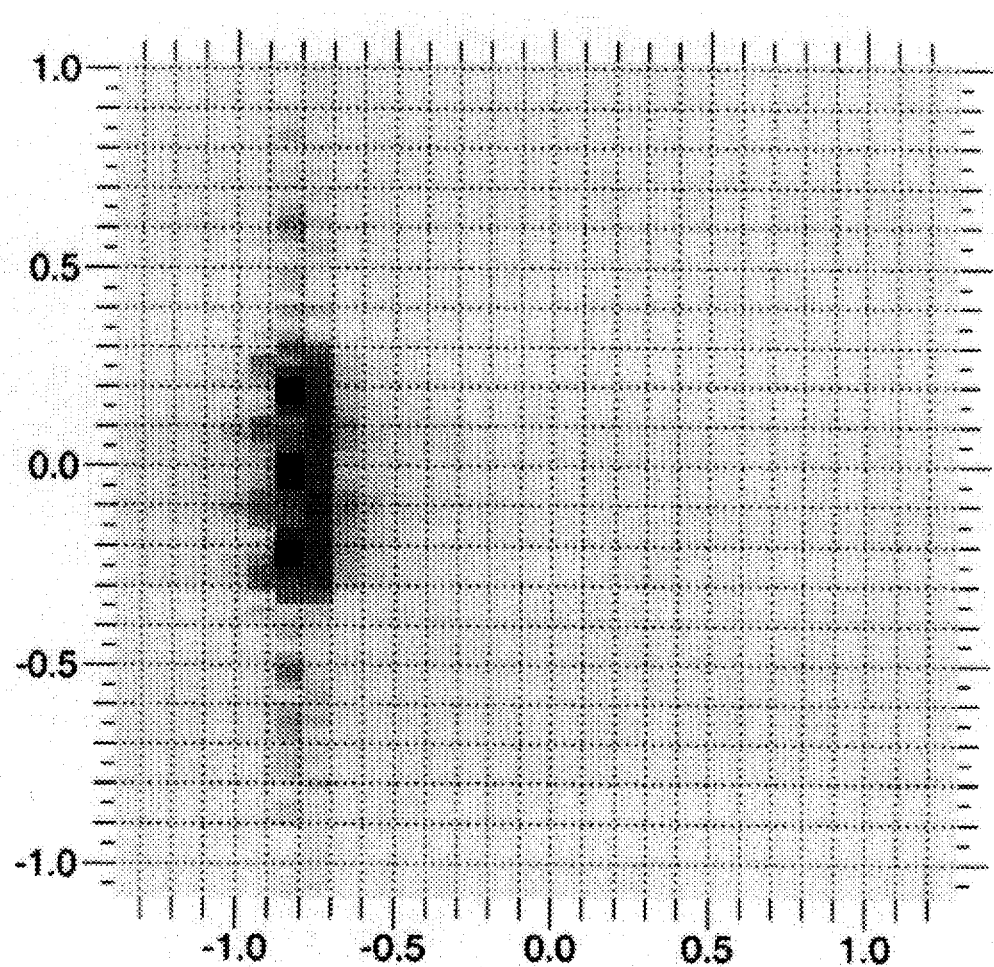
FIG. 7 shows an image formed by traditional linear SA for the case of residual motion error=RMS(0.001 m).
Figure 8:
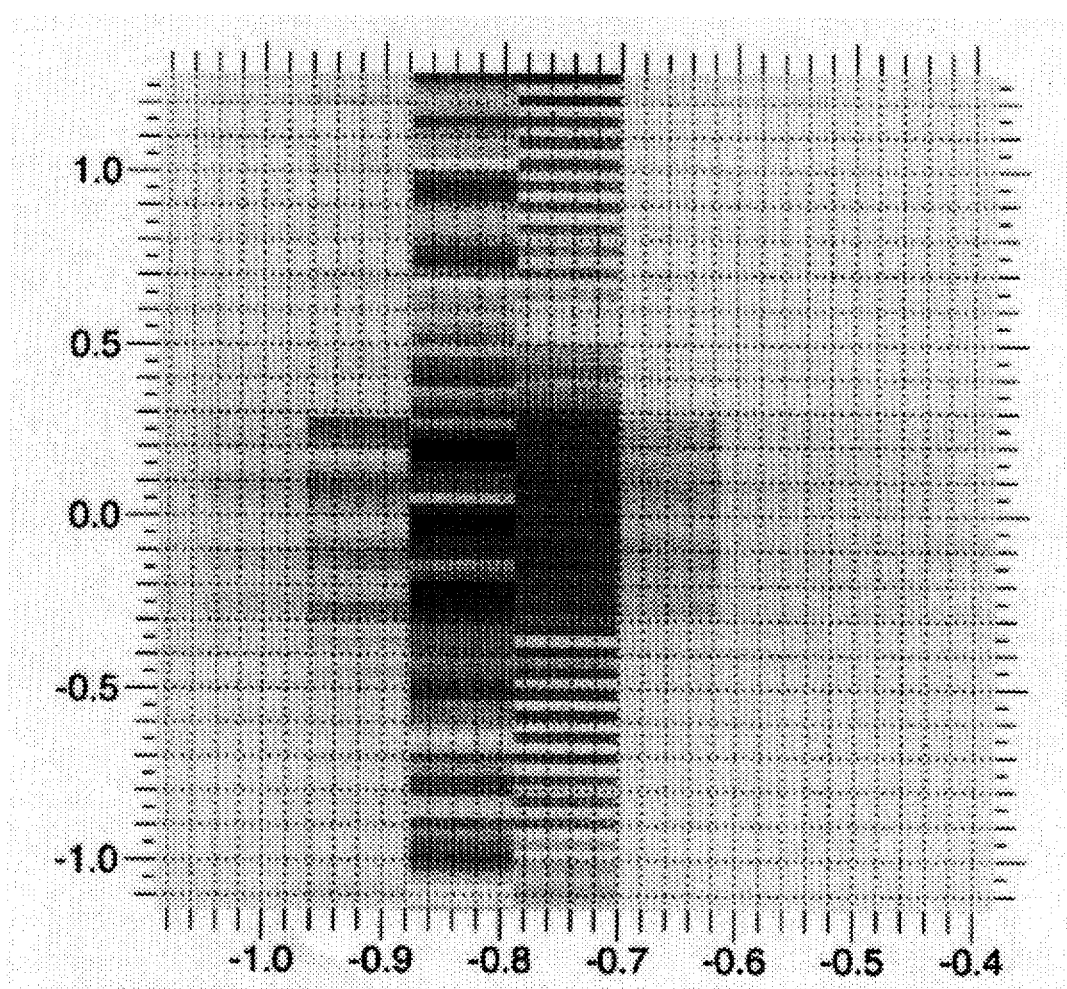
FIG. 8 shows an image formed by traditional linear SA for the case of residual motion error=RMS(0.003 m).

Clearly, this is an extremely tight specification for an operational system. FIGS. 6, 7, and 8 show the representative imaging performance (Cartesian plane, vertical :x axis, horizontal y axis, three targets at y=[−0.2 m, 0.0 m, 0.2 m]) of a linear wavenumber SA processing chain as described above for the example case of a 100 Khz sonar previously cited with the residual motion error of 0.0 m, 0.001 m and 0.003 m RMS respectively. As discussed, image degradation is partial at 0.001 m RMS error, and completely dominating at 0.003 m RMS error.

To mitigate these phase randomizing effects, motion compensation techniques strive to measure the absolute position of the transceiver to accuracies well within a wavelength such that $RMS(k_x\Delta_{x_1}) \ll 1$. A primary feature of the present invention is that the residual phase error embodied within the REWSA equivalent to equation 23, can be substantially attenuated by "reducing" the equivalent wavenumber that position perturbations are "seen" through.

REWSA Algorithm

Figure 4:
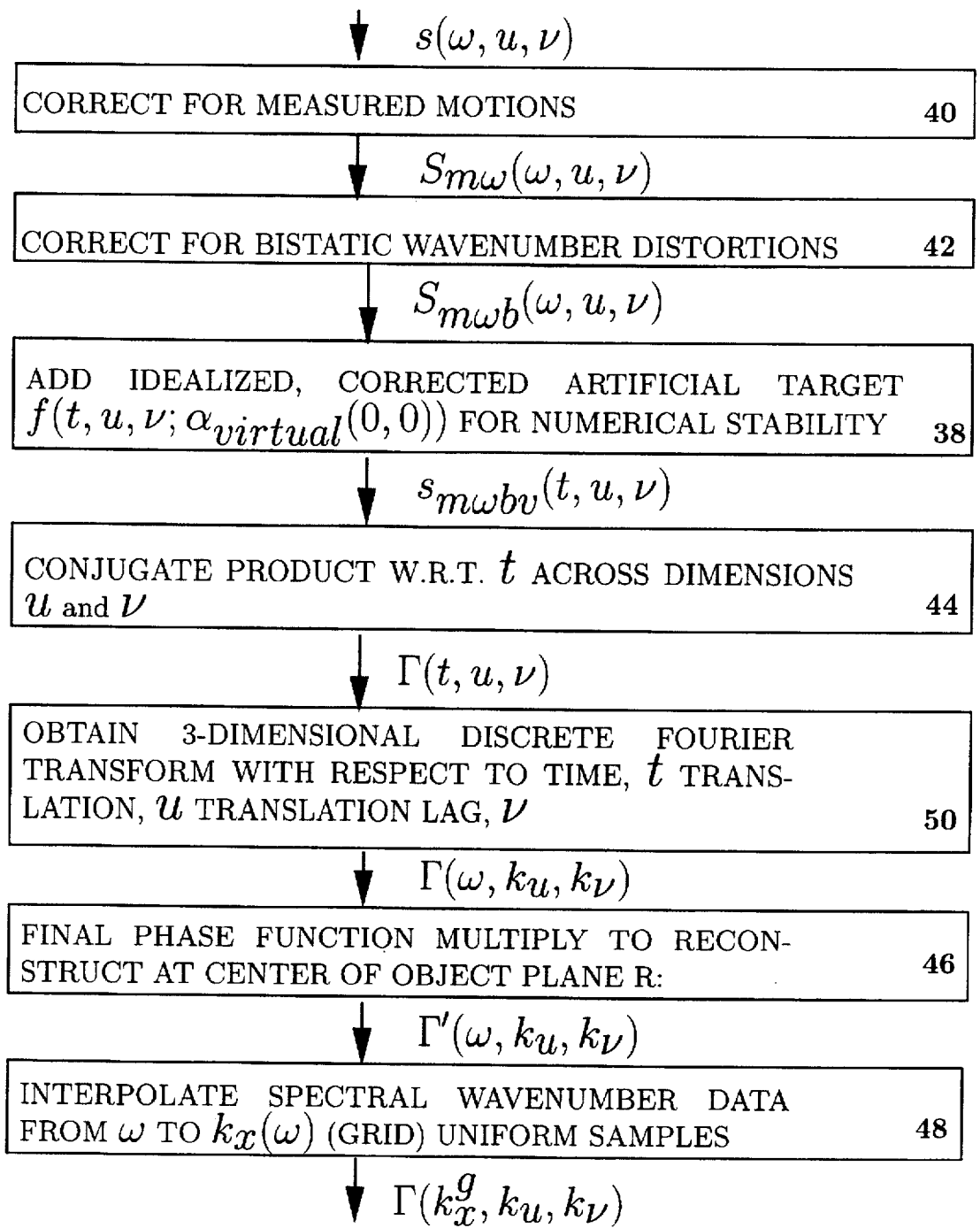
FIG. 4 shows the processing flow for an imaging system which accepts as input s(ω,u,υ) and outputs the multidimensional dataset $\Gamma(k_x^s,k_u,k_v)$.

In order to reduce the characteristic horizontal wavenumber of the system of the present invention, we form the conjugate (interferometric) product of the motion compensated signal $s_{m\omega}(t,u)$ defined in equation 21 and shown in step 44 of FIG. 4: (Steps 38 and 42 will be discussed shortly).

$$\Gamma(t,\tau,u,\upsilon) = s_{m\omega}(t+\tau,u+\upsilon)s^*_{m\omega}(t-\tau,u-\upsilon)\quad(26)$$

where $s_{m\omega}(t,u)$ is the inverse FT of $S_{m\omega}(\omega,k_u)$ (equation 21 or the output of step 40 of FIG. 4) evaluated at offsets, $\tau$, a temporal lag variable, and $\upsilon$, a spatial lag variable.

Hence, a new four dimensional data set $\Gamma(t,\tau,u,\upsilon)$ is formed from the two dimensional data set of equation 4 (or more accurately its spectral and motion error compensated counterpart, equation 21). The temporal lag variable $\tau$ is readily formed by selecting time offsets from a function of time t. Likewise, the spatial lag variable $\upsilon$ can be formed through selection of a subset of the along track data (item 8 in FIG. 1) over spatial variable $u_j$ with offset $\upsilon_j$, $0 \le j \le N$, but can also be developed by the simultaneous reception dechoes across a real, physical aperture whose elements are placed at offsets of $v_j$; this is a bistatic mode (FIG. 2) to discussed shortly. While, the mono-static and bistatic models (and subsequent inversions) differ enough to warrant separate presentation, both variations are based on the underlying principle of reduced wavenumber synthetic aperture.

Monostatic Model

Performing an inverse FT on both dimensions of $S_{m\omega}(\omega, k_u)$ (equation 21) yields $$S_{m\omega}(t,u) = \iint d\omega_1 d\alpha_u \Psi(\alpha_x,\alpha_u) E[j(\alpha_x \Delta_{x_1} + \alpha_u Y_1)] E[j(\alpha_u u + \omega_1 t)] \quad (27)$$

with residual position error $\Delta_{x_1} = X_1(u) - \hat{X}_1(u)$.

$$\begin{aligned}
\Gamma(t,\tau,u,v) &= s_{m\omega}(t+\tau,u+v) s^*_{m\omega}(t-\tau,u+v) \\
&= \int d\omega_1 \int d\omega_2 \\
&\quad \int d\alpha_u E[j(\alpha_x \Delta_{x_1} + \alpha_u Y_1)] \Psi(\alpha_x,\alpha_u) E[j(\alpha_u(u+v) + \omega_1(t+\tau))] \\
&\quad \int d\beta_u E[-j(\beta_x \Delta_{x_1} + \beta_u Y_1)] \Psi^*(\beta_x,\beta_u) E[-j(\beta_u(u+v) + \omega_2(t+\tau))]
\end{aligned} \quad (28)$$

where temporal frequencies $\omega_1$ and $\omega_2$ are baseband quantities, and the two horizontal wavenumbers $\alpha_x$ and $\beta_x$ maintain a realistic dependence on the carrier frequency $\omega_c$ through $$\alpha_x = \sqrt{\left(\frac{2(\omega_c+\omega_1)}{C}\right)^2 - \alpha_u^2} \quad (29)$$

and $$\beta_x = \sqrt{\left(\frac{2(\omega_c+\omega_2)}{C}\right)^2 - \beta_u^2} \quad (30)$$

Although the 3D Fourier Transform of step 36 of FIG. 4

$$FT(\Gamma(w_o,\tau,u,v)) \to \Gamma(w_o,\Theta,k_u,k_v) \quad (31)$$

can be performed in a single subroutine, to facilitate an understanding of the advantages of the present invention we will break out each dimension of the 3D Fourier transform.

Now, collect terms with $E[jt]$, take the FT $t \to w_o$, to yield $\delta(\omega_1 - \omega_o - \omega_2)$ within an integral over baseband variable $\omega_1$ that yields $$\Gamma(\omega_o,\tau,u,v) = \iiint d w_2 \, d\alpha_u d\beta_u \Psi(\alpha_x^o,\alpha_u) \Psi^*(\beta_x,\beta_u) \quad (32)$$

$$E[j\Delta_{x_1}(\alpha_x^o - \beta_x)] E[jY_1(\alpha_u - \beta_u)]$$

$$E[j\tau(\omega_o + 2\omega_2)] E[ju(\alpha_u - \beta_u)] E[jv(\alpha_u + \beta_u)]$$

where $\alpha_x$ evaluated at $\omega_1 = \omega_o + \omega_2$ is $$\alpha_x^o = \sqrt{\left(\frac{2(\omega_c+\omega_o+\omega_2)}{C}\right)^2 - \alpha_u^2} \quad (33)$$

Now, collect terms with $E[ju]$, take the FT $u \to k_u$ to yield $\delta(\beta_u - (\alpha_u - k_u))$ within an integral over baseband variable $\beta_u$ that yields after some rearrangement $$\Gamma(w_o,\tau,k_u,v) = E[jY_1(k_u)] \iint d\omega_2 d\alpha_u \Psi(\alpha_x^o,\alpha_u) \Psi^*(\beta_x^o,\alpha_u-k_u) E$$
$$[j\Delta_{x_1}(\alpha_x^o - \beta_x^o)] E[j\tau(\omega_o + 2\omega_2)] E[jv(2\alpha_u - k_u)] \quad (34)$$

where $\beta_x$ evaluated $\beta_x^o = (\alpha_u - k_u)$ is $$\beta_x^o = \sqrt{\left(\frac{2(\omega_c+\omega_2)}{C}\right)^2 - (\alpha_u - k_u)^2} \quad (35)$$

Now, collect terms with $E[jv]$, take the FT $v \to k_v$ to yield $$\delta\left(\alpha_u - \frac{k_u + k_v}{2}\right)$$

within an integral over $\alpha_u$ that yields $$\Gamma(w_o,\tau,k_u,k_v) = E[jY_1(k_u)] \int d\omega_2 \quad (36)$$

$$\Psi\left(\alpha'_x,\frac{k_v+k_u}{2}\right) \Psi^*\left(\beta'_x,\frac{k_v-k_u}{2}\right)$$

$$E[j\Delta_{x_1}(\alpha'_x - \beta'_x)] E[j\tau(\omega_o + 2\omega_2)]$$

where $\alpha_x^o$ evaluated at $$\alpha_u = \frac{k_u + k_v}{2}$$

is $$\alpha'_x = \sqrt{\left(\frac{2(\omega_c+\omega_o+\omega_2)}{C}\right)^2 - \left(\frac{k_u+k_v}{2}\right)^2} \quad (37)$$

and $\beta_x^o$ evaluated at $$\alpha_u = \frac{k_u + k_v}{2}$$

is $$\beta'_x = \sqrt{\left(\frac{2(\omega_c+\omega_2)}{C}\right)^2 - \left(\frac{k_p - k_u}{2}\right)^2} \quad (38)$$

Developing images from a 3D instead of 4D wavenumber database.

It should be noted that it is often adequate to obtain an estimate of the absolute value of the final image. The need for a complex image arises in the interferometric SAR application where estimates of topography are developed through an interferometry of two distinct SA images developed by in the vertically displaced transceivers. In the case where the absolute value $â(x,y)$ is sufficient, equation 36 can serve as the final form of the wavenumber database $\Gamma$, and the entire $\tau$ domain can be suppressed. The intermediate wavenumbers $\alpha'_x$ and $\beta'_x$ can be shown to have weak dependencies on $\omega_2$ (the integration variable) and the inversion of $\Gamma(w_o,\tau=0,k_u,k_v)$ (now a 3D wavenumber database) will yield a slightly smeared (due to the integration over $\omega_2$) version of the final image.

Final Transform

Now, collect terms with E[jτ], take the FT τ→Θ to yield $$\delta\left(\omega_2 - \frac{\Theta - \omega_o}{2}\right)$$

within an integral over $\omega_2$ that yields $$\Gamma(w_o, \Theta, k_u, k_v) = \quad (39)$$

$$E[jY_1(k_u)]E[j\Delta x_1(\alpha''_x - \beta''_x)]\Psi\left(\alpha''_x, \frac{k_v + k_u}{2}\right)\Psi^*\left(\beta''_x, \frac{k_v - k_u}{2}\right)$$

where $\alpha'_x$ evaluated at $\omega_2 - \frac{\Theta - \omega_o}{2}$ is $$\alpha''_x = \sqrt{\left(\frac{(\omega_c + \Theta + \omega_o)}{C}\right)^2 - \left(\frac{k_u + k_v}{2}\right)^2} \quad (40)$$

and $\beta'_x$ evaluated at $\omega_2 - \frac{\Theta - \omega_o}{2}$ is $$\beta''_x = \sqrt{\left(\frac{(\omega_c + \Theta - \omega_o)}{C}\right)^2 - \left(\frac{k_v - k_u}{2}\right)^2} \quad (41)$$

Defining new variables $$\gamma_x = \frac{\alpha''_x + \beta''_x}{2} \quad (42)$$

and $$\delta_x = \frac{\alpha''_x - \beta''_x}{2}, \quad (43)$$

equation 39 can be recast in the form $$\gamma(w_o, \Theta, k_u, k_v) = \quad (44)$$

$$E[jY_1(k_u)]E[j\Delta x_1(\alpha''_x - \beta''_x)]$$

$$\Psi\left(\frac{\gamma_x + \delta_x}{2}, \frac{k_v + k_u}{2}\right)\Psi^*\left(\frac{\gamma_x - \delta_x}{2}, \frac{k_v - k_u}{2}\right).$$

With some additional wavenumbers defined as $k_c = \omega_c/C$ and $k_\Theta = \Theta/C$, the Taylor series approximation for $\gamma_x$ and $\delta_x$ is $$\gamma_x - 4k_C + 4k_\Theta - \frac{k_u^2 + k_v^2}{8k_C} + \frac{2k_v k_u k_o + (k_u^2 + k_v^2)k_\Theta}{8k_c^2} + \ldots \quad (45)$$

$$\delta_x - 4k_o - \frac{k_v k_u}{4k_C} + \frac{(k_u^2 + k_v^2)k_o + 2k_v k_u k_\Theta}{8k_c^2} + \ldots \quad (46)$$

It can be seen that the residual phase error of the REWSA processor $$E[j2\Delta_{x_1}\delta_x], \quad (47)$$

is now primarily dependent on $$k_o = \frac{\omega_o}{C} \text{ and not } k_c = \frac{\omega_c}{C}.$$

With $\omega_o$, the baseband frequency offset, (max($\omega_o$)) defined as the half bandwidth of the system (BW)), and $\omega_c$ the carrier frequency, it is seen that the REWSA process has reduced the overall system sensitivity to residual position error by a factor of $$\frac{\omega_c}{2BW}.$$

This fraction, carrier frequency over bandwidth, is often referred to as the Q of a system and is a measure of how narrowband a system is. This is a significant improvement in the sensitivity of the inversion process to residual motion error. Morever, equation 46 shows that this is a worst case sensitivity since $\delta_x$ reaches its highest value only at the extreme portions of the $k_o, k_u, k_v$ data volume.

Correcting for the squint angle phase factor $E[jY_1(k_u)]$ and dropping the residual motion error $E[j\Delta_{x_1}(\alpha''_x - \beta''_x)]$ from the notation, we are left with the final wavenumber database $$\Gamma(w_o, \Theta, k_u, k_v) = \quad (48)$$

$$\Psi\left(\frac{\gamma_x + \delta_x}{2}, \frac{k_v + k_u}{2}\right)\Psi^*\left(\frac{\gamma_x - \delta_x}{2}, \frac{k_v - k_u}{2}\right),$$

which takes the form of a two spatial frequency correlation function in both the x and y dimensions.

Time/Frequency Inversion Procedure

Recalling the target reflectivity function $\alpha(x,y)$ defined on a two dimensional support (x,y) and its 2D spatial Fourier Transform $\Psi(k_x, k_\zeta)$, the two spatial frequency correlation function of $\alpha(x,y)$ on both dimensions—a function of four variables is defined as, $$\Gamma(\gamma_{x_1}, \delta_{x_2}, k_u, k_v) = \Psi_{\Psi,\Psi}\left(\frac{\gamma_{x_1} + \delta_{x_2}}{2}, \quad (49)\right.$$

$$\left.\frac{k_v + k_u}{2}\right)\Psi^*_{\Psi,\Psi}\left(\frac{\gamma_{x_1} - \delta_{x_2}}{2}, \frac{\gamma_{x_1} - \delta_{x_2}}{2}, \frac{k_v - k_u}{2}\right)$$

It can be shown that performing the spatial Fourier Transform (FT) $k_u \to y_u$ and the FT $k_v \to y_v$ yields $$\Gamma(\gamma_{x_1}, \delta_{x_2}, y_v, y_u) = \quad (50)$$

$$\Psi_{\Psi,\alpha}\left(\frac{\gamma_{x_1} + \delta_{x_2}}{2}, y_v + y_u\right)\Psi^*_{\Psi,\alpha}\left(\frac{\gamma_{x_1} - \delta_{x_2}}{2}, y_v - y_u\right)$$

and that further spatial Fourier transforms $\gamma_{x_1} \to x_1$ and $\delta_{x_2} \to x_2$ yield $$\Gamma(x_1, x_2, y_v, y_u) = \Psi_{\alpha,\alpha}(x_1 + x_2, y_v + y_u)\Psi^*_{\alpha,\alpha}(x_1 - x_2, y_v - y_u). \quad (51)$$

The subscripts for $\Psi$ (ie $\Psi_{\Psi,\alpha}$) make clear what side of the Fourier transform either dimension reside on as a result of a given operation.

Evaluating at $y_u = y_v$ and $x_1 = x_2$ yields $$\Gamma(x_1, x_2, y_v, y_u) = \Psi(x_1 + x_2, y_v + y_u)\Psi^*(x_1 - x_2, y_v - y_u) \quad (52)$$

evaluating at $x_1 = x_2$ and $y_u = y_v$ yields the product $$\alpha(2x_1, 2y_u)\alpha^*(0,0) \quad (53)$$

This the 2D version of the well known result that a two-frequency correlation function $\gamma(k_u, k_v)$ can be inverted to obtain $\alpha(2\upsilon)\alpha(0)$. If $\alpha^*(0)$ is known then the function $\alpha(2\upsilon)$ can be estimated from the inversion of $\Gamma(x_1, x_2, y_v, y_u)$ as described above.

3D Wavenumber Database

If a system design uses equation 36 as the final wavenumber database, then a single Time/Frequency inversion

15

Figure 5:
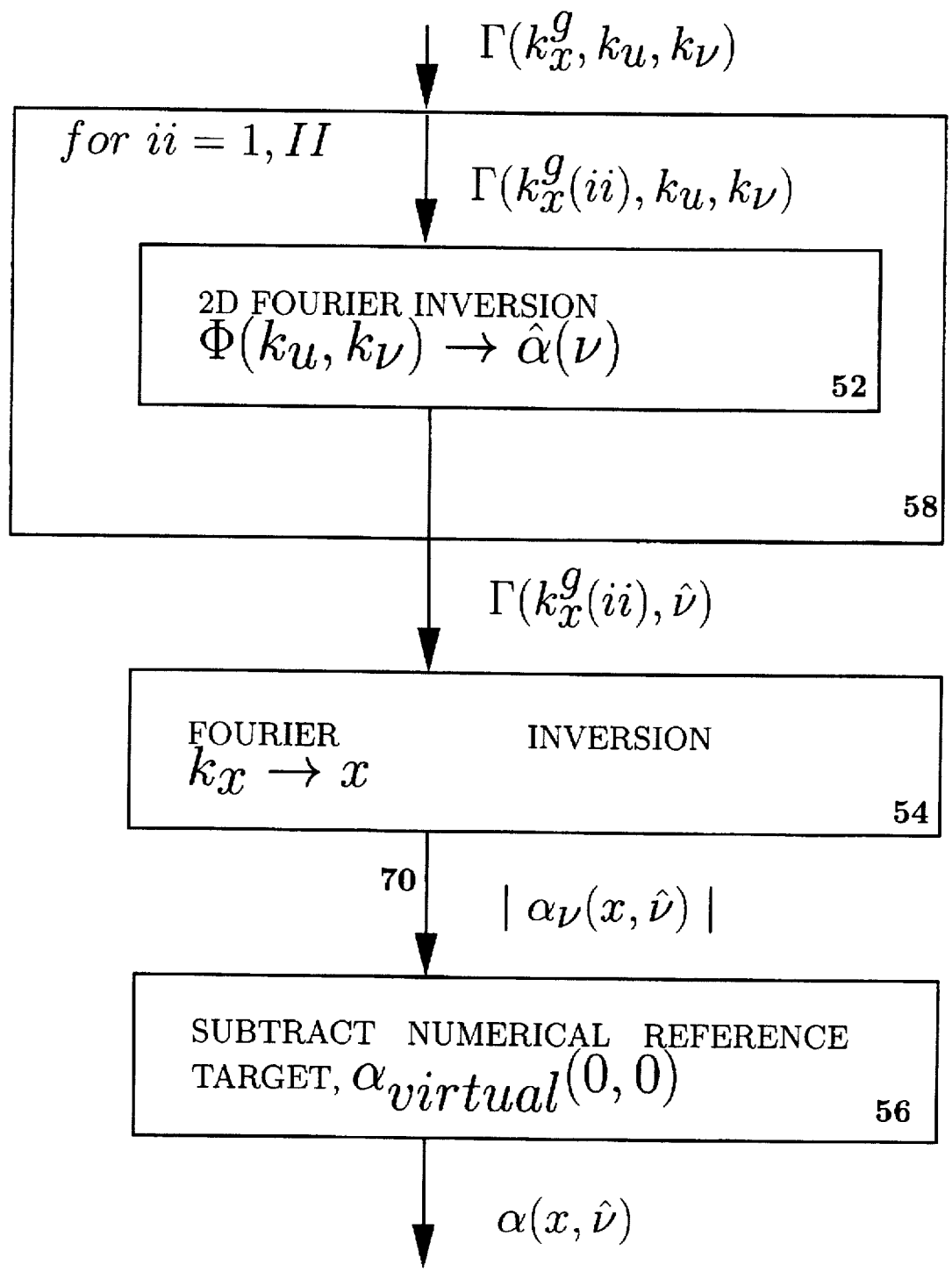
FIG. 5 shows the processing flow for inverting the wavenumber database and generating the final image.

$(k_u, k_v \rightarrow y)$ is performed to collapse the y dimension (FIG. 5, steps 58 and 52), and followed by a single dimension spatial inverse transform $(k_x \rightarrow x)$ (FIG. 5, step 54) which generates (within a scaling factor)

$$|\alpha(2x_1, 2y_u)| \tag{54}$$

or $\alpha(x, \hat{v})$ (item 70 of FIG. 5).

Plot Discussion

Figure 9:
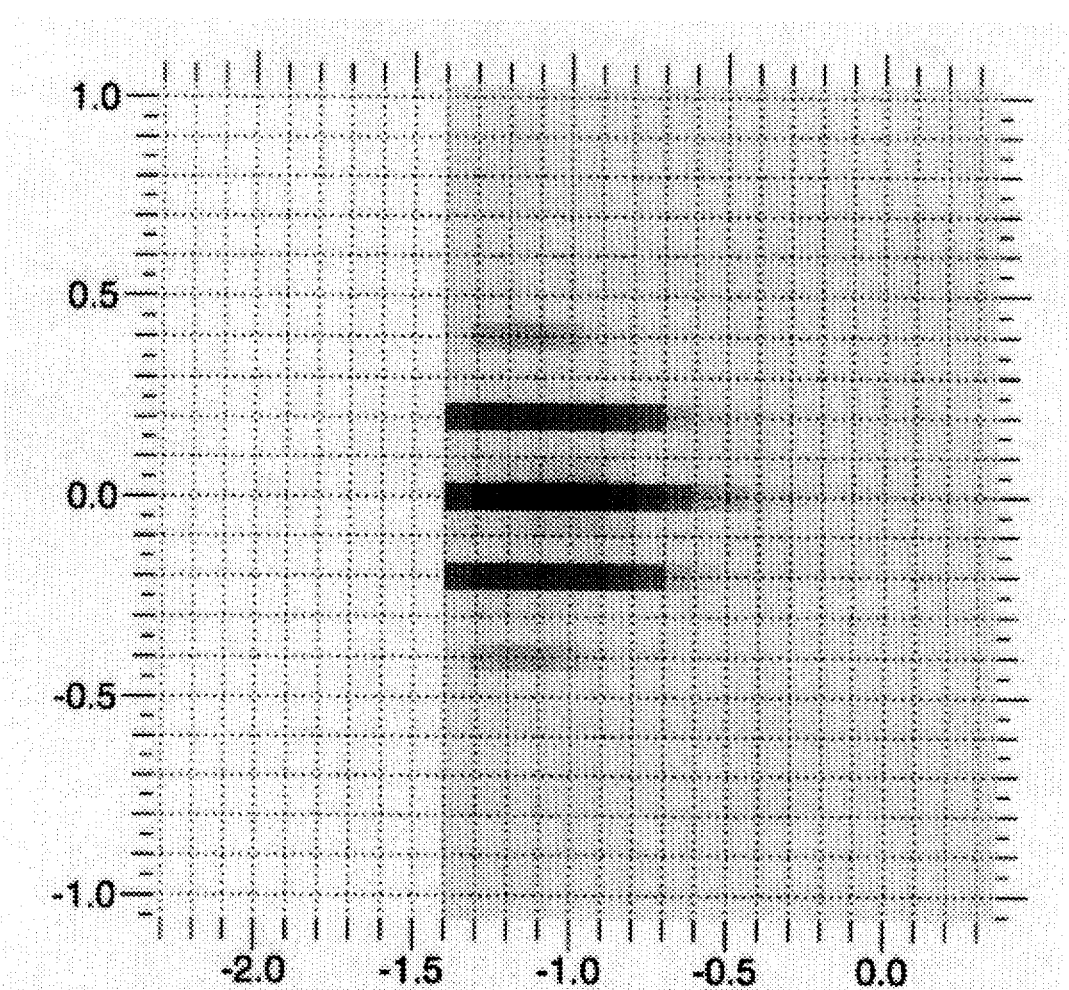
FIG. 9 shows an image formed by REWSA for the case of idealized, zero residual motion error.
Figure 10:
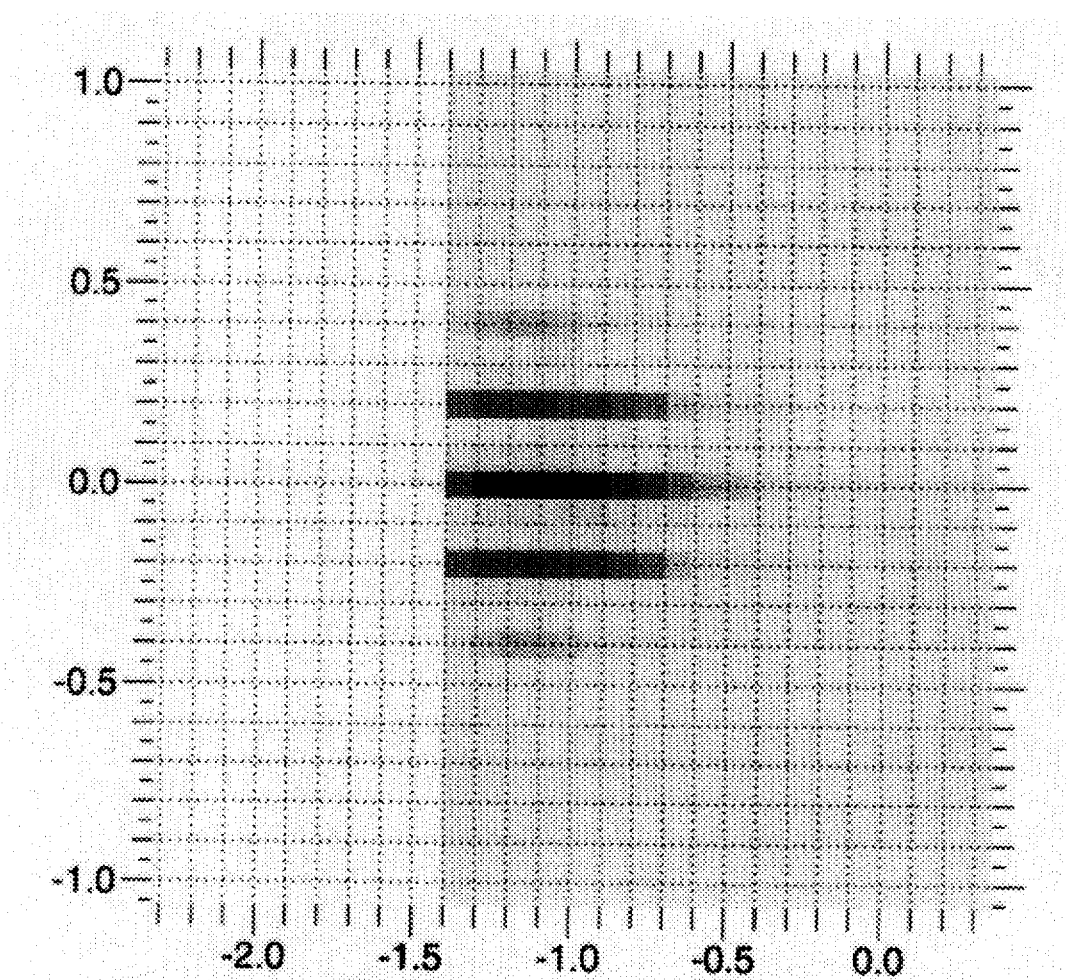
FIG. 10 shows an image formed by REWSA for the case of residual motion error=RMS(0.03 m).
Figure 11:
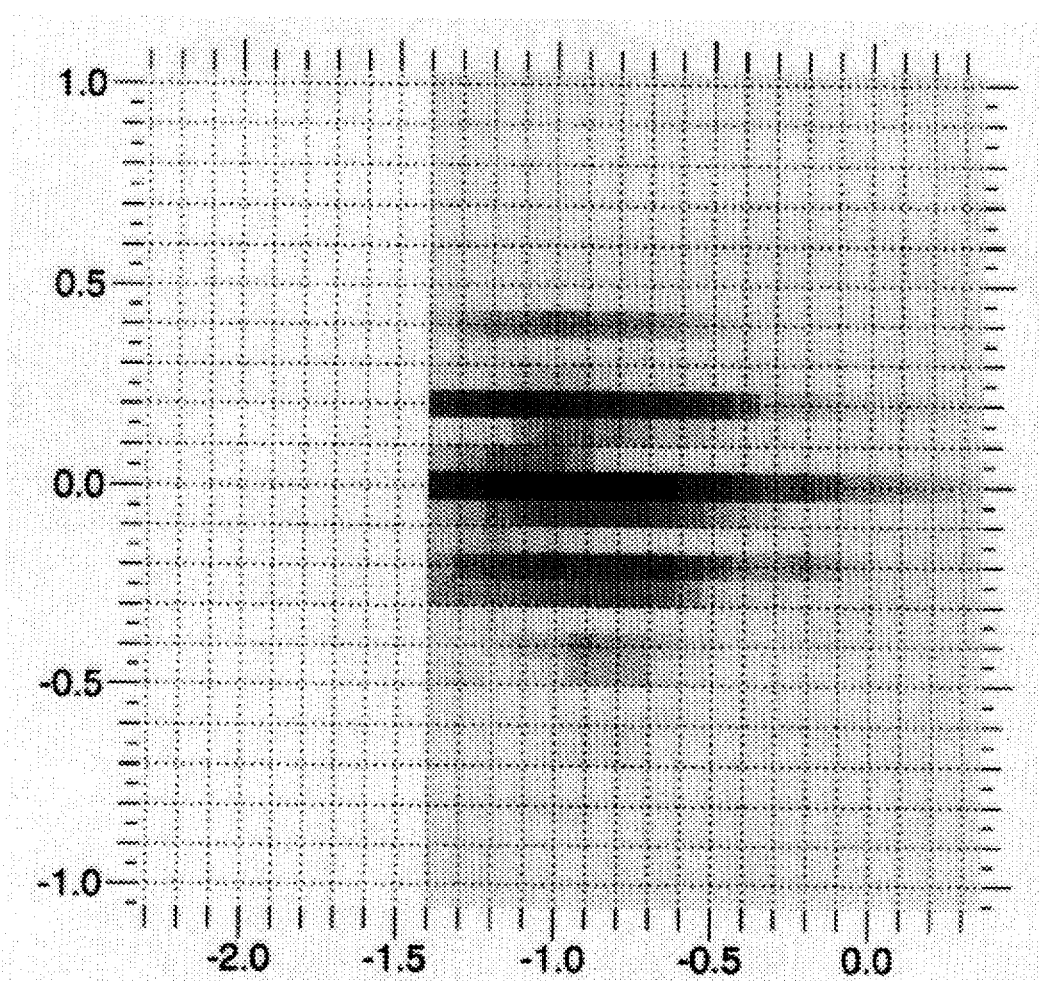
FIG. 11 shows an image formed by REWSA for the ease of residual motion error=RMS(0.99 m).

FIGS. 9, 10, and 11 show the representative imaging performance (Cartesian plane, vertical :x axis, horizontal y axis, three targets at y=[−0.2 m, 0.0 m, 0.2 m]) of a REWSA processing chain as described above for the example case of a 100 Khz sonar previously cited with the residual motion error of 0.0 m, 0.03 m and 0.99 m RMS respectively. The latter two cases are significantly larger residual errors than a linear SA processor could tolerate, and highlight the reduced wavenumber characteristic of the present invention. The across track smearing (in the x direction) of FIG. 11 is a direct effect of the extremely high residual error (RMS of 0.99 m); Completely unprecedented in the performance expections of prior efforts in traditional linear SA methodologies, the REWSA processor maintains significant coherence in the translation direction even in the presence of residual motion error that visibly smears the across track image quality.

Numerical Robustness

In the 2D imaging case (with two pairs of two-frequency correlation functions comprising four dimensions), the equivalent function that must be known a priori is $\alpha^*(0,0)$, which is defined as "center" value of the target reflectivity image. From a system design perspective, it is unacceptable to have the robustness of the entire inversion depend on the data values being taken (i.e. if there are no targets at $\alpha^*(0,0)$, the inversion blows up).

The solution is surprisingly simple. In FIG. 4 a step 38 is provided where a synthesized SA return for a target located at (0,0) (a virtual target $\alpha_{virtual}(0,0)$) can be added to the original set of returns. Because the target is linearly added before the conjugate product step 44, it will interact with all "real" targets, developing all the interference terms that an existing target at this position would have generated.

To ensure that the value of $\alpha^*(0,0)$ is strongly dominated by the virtual target $\alpha_{virtual}(0,0)$, its scatterer strength should be set to at least a factor of 100 greater than any target expected within the target field. Modern IEEE floating point numerical representations have significant dynamic range, to accomodate this procedure.

Bistatic Model

Figure 2:
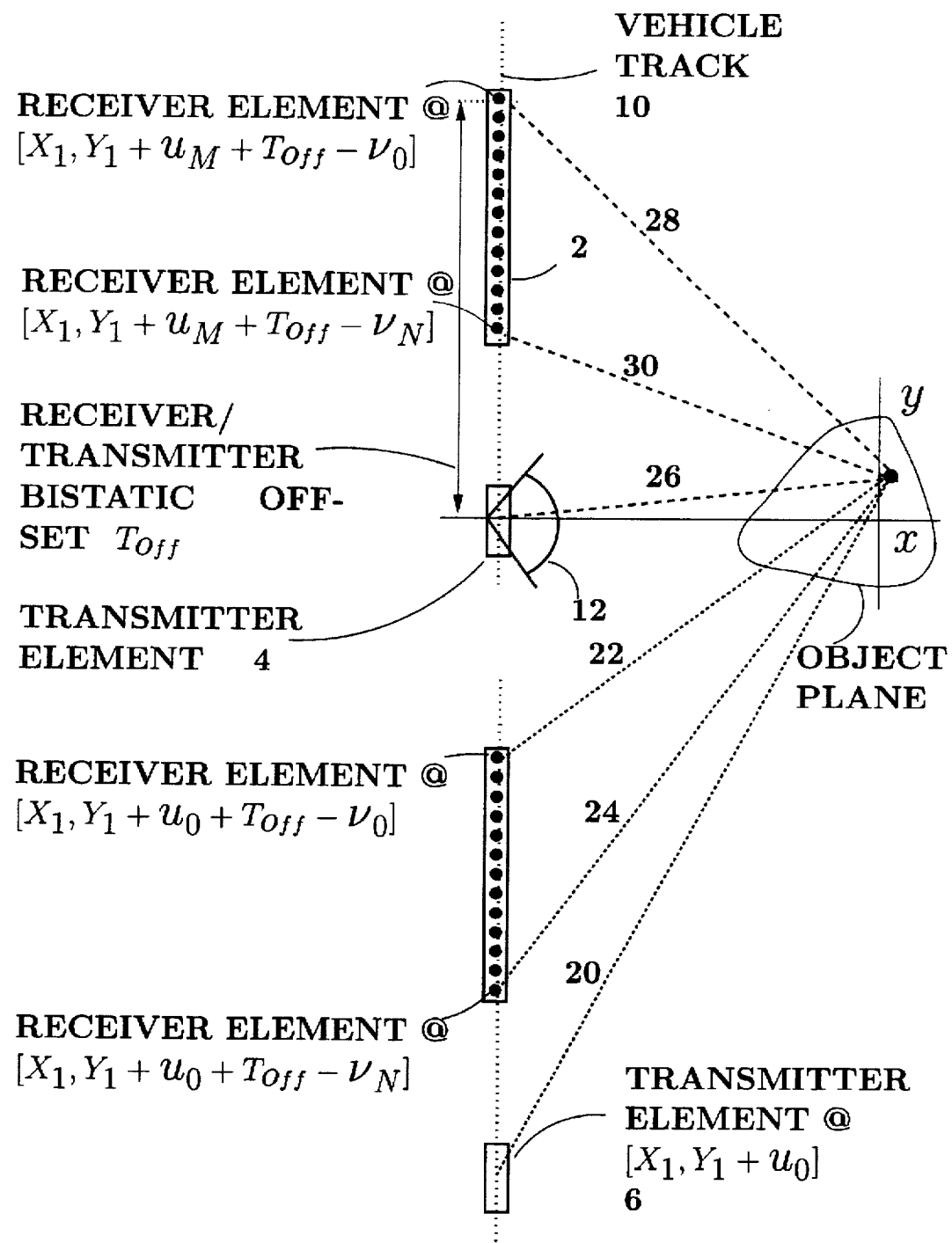
FIG. 2 shows a typical bistatic measurement scenario of the present invention.

FIG. 2 describes a transceiver with a single transmit element 6 with azimuthal beam pattern 12 and a multiple element receive array 2 used to develop the data set defined as $$\Gamma(t,\tau,u,v;T_{off}) = s_{ma}(t+\tau,u+T_{off})s^*_{ma}(t-\tau,i+T_{off}v). \tag{55}$$

In FIG. 2, the transceiver is drawn at two positions to emphasize the combination of bistatic measurement and synthetic aperture through translation. By measuring signals over several receive transducers simultaneously, bistatic designs can sample more aperture than monostatic designs in the same amount of time. This is an especially important advantage in acoustic imaging where the propagation speed of the medium is relatively slow.

In order to implement a successful bistatic design, the differing propagation paths between [transmitter/object] and [object/receiver] must be accounted for. The propagation paths include 20; [transmitter/object] propagation path at $u_0$, 22; [object/receiver] propagation path at $u_0, v_0$, 24; [object/receiver] propagation path at $u_0, v_N$, 26; [transmitter/object] propagation path at $u_M$, 28; [object/receiver] propagation path at $u_M, v_0$, and 30; [object/receiver] propagation path at $u_M, v_N$. Formulations for casting the bistatic SAR signal $s(t, u; T_{off})$ into a modified version of equation 5 are available in the literature. One formulation that is particularly useful in synthetic aperture sonar is a modification of equation 5.

$$s_{ma}(t,u+T_{off}) = \underbrace{\iint d\omega_1 d\alpha_u \, \Psi(\alpha_x, \alpha_u) E[j(\alpha_x X_1 + \alpha_u Y_1)]}_{S(\omega, \alpha_u)} \tag{56}$$

$$\underbrace{E\left[j\left(\alpha_x \frac{T^2_{off}}{4R} + \alpha_u \frac{T_{off}}{2}\right)\right] E[j(\alpha_u u + \omega_1 t)]}_{\text{bistatic terms}}$$

where t,u are the temporal/spatial SA variables, $\alpha_u, \alpha_x$ are wavenumbers as before and $T_{off}$ is the spatial offset between the transmit and $0^{th}$ receive element.

The quadratic phase function in the bistatic term of equation 56 is actually time dependent through the fact that contributing returns at time t are positioned around range delay R(t) as well as wavenumber dependent through $\alpha_x$ as $$E\left[j\alpha_x \frac{T^2_{off}}{R(t)}\right]. \tag{57}$$

Correcting for this bistatic phase correction involves inserting the three dimensional phase term $$\Phi_b(t, \omega, \alpha_x) = E\left[-j\alpha_x \frac{T^2_{off}}{R(t)}\right] \tag{58}$$

inside the double integral of equation 56, which is very memory intensive. The practical compromise involves considering the specifics of a given measurement scenario to define the best means to correct for this term to within an acceptable level of precision.

In accordance with the present invention, we have found it simpler and more direct to correct for the quadratic component of the bistatic phase term before the conjugate product step 44 of FIG. 4. Systems that operate with $X_o << R$ can best use $$\Phi_b(\omega, \alpha_x) = E\left[-j\alpha_x \frac{T^2_{off}}{4R}\right] \tag{59}$$

in the $(\omega, u)$ domain after the $\omega_1 \rightarrow \tau$ inverse FT, with residual phase error $$\Phi_{res} = E\left[-j\alpha_x \left(\frac{T^2_{off}}{4R_{nom}} - \frac{T^2_{off}}{4R(t)}\right)\right], \tag{60}$$

while systems that operate with $X_o < R$ can best use $$\Phi_b(t, \omega) = E\left[-j2k_c \frac{T^2_{off}}{4R(t)}\right] \tag{61}$$

in the (t,u) domain after the $\alpha_u \rightarrow u$ inverse spatial FT, with residual phase error $$\Phi_{res} = E\left[-j(2k_c - \alpha_x) \frac{T^2_{off}}{4R(t)}\right]. \tag{62}$$

Equations 60 and 62 should be interpreted as the residual phase error that a specific bistatic measurement u,v "sees" a portion of the target regime through. We define the signal corrected for this quadratic phase, along with the motion perturbations as $$s_{mcb}(t,u+T_{off}) = \int d\omega_1 d\alpha_u \Psi(\alpha_x,\alpha_u) E[j(\alpha_x \Delta x_1 + \alpha_u Y_1)] \quad (63)$$

$$E\left[j\left(\alpha_u \frac{T_{off}}{2}\right)\right] E[j(\alpha_u u + \omega_1 t)],$$

where $\Delta_{x_1}$ is the residual position error (this corresponds to step 42 of FIG. 4).

Now denote the conjugate product of step 44 of FIG. 4 for the bistatic case as $$\Gamma_b(t,\tau,u,\upsilon,T_{off}) = s_{mcbv}(t+\tau,u+T_{off}) s^*_{mcbv}(t-\tau,u+T_{off}-\upsilon). \quad (64)$$

where the subscript $s_{mcbv}(\ )$ marks the additional bistatic phase correction step along the addition of the virtual target $\alpha_{virtual}(0,0)$.

$$\Gamma_b(t,\tau,u,\upsilon) = \iint d\omega_1 d\alpha_u E[j(\alpha_x \Delta x_1 + \alpha_u Y_1)] \Psi(\alpha_x,\alpha_u) \quad (65)$$

$$E[j(\alpha_u(u) + \omega_1(t+\tau))] E\left[j\left(\alpha_u \frac{T_{off}}{2}\right)\right] *$$

$$\iint d\omega_2 d\beta_u E[-j(\beta_x \Delta x_1 + \beta_u Y_1)] \Psi^*(\beta_x,\beta_u)$$

$$E[-j(\beta_u(u) + \omega_2(t-\tau))] E\left[-j\left(\beta_u \frac{T_{off}-\upsilon}{2}\right)\right]$$

Now collect terms with $E[jt]$, take the FT $t \to w_o$, integrate over $\omega_1$ with $\delta(\omega_1-(\omega_o+\omega_2))$ and rearrange terms:

$$\Gamma_b(\omega_o,\tau,u,\upsilon) = \iiint d\omega_2 d\alpha_u d\beta_u \Psi(\alpha_x^o,\alpha_u) \Psi^*(\beta_x,\beta_u) \quad (66)$$

$$E[j\Delta x_1(\alpha_x^o - \beta_x)] E[jY_1(\alpha_u - \beta_u)] E[j\tau(\omega_o + 2\omega_2)]$$

$$E[ju(\alpha_u - \beta_u)] E\left[j\left(\alpha_u \frac{T_{off}}{2}\right)\right] E\left[-j\left(\beta_u \frac{t_{off}-\upsilon}{2}\right)\right],$$

where $$\alpha_x^o = \sqrt{\left(\frac{2(\omega_c + \omega_o + \omega_2)}{C}\right)^2 - \alpha_u^2}. \quad (67)$$

Now collect terms with $E[ju]$, take the FT $u \to k_u$, integrate over $\beta_u$ with $\delta(\beta_u-(\alpha_u-k_u))$ $$\Gamma_b(\omega_o,\tau,k_u,\upsilon) = E[jY_1(k_u)] \iint d\omega_2 d\alpha_u \Psi(\alpha_x^o,\alpha_u) \Psi^*(\beta_x^o,\alpha_u-k_u) \quad (68)$$

$$E[j\Delta x_1(\alpha_x^o - \beta_x^o)] E[j\tau(\omega_o + 2\omega_2)]$$

$$E\left[j\left(\alpha_u \frac{T_{off}}{2}\right)\right] E\left[-j\left((\alpha_u - k_u)\frac{T_{off}-\upsilon}{2}\right)\right]$$

$$= E[jY_1(k_u)] \iint d\omega_2 d\alpha_u \Psi(\alpha_x^o,\alpha_u) \Psi^*(\beta_x^o,\alpha_u-k_u)$$

$$E[j\Delta x_1(\alpha_x^o - \beta_x^o)] E[j\tau(\omega_o + 2\omega_2)]$$

$$E\left[jk_u \frac{T_{off}}{2}\right] E\left[-j\upsilon \frac{\alpha_u - k_u}{2}\right] \quad (69)$$

where $$\beta_x^o = \sqrt{\left(\frac{2(\omega_c - \omega_2)}{C}\right)^2 - (\alpha_u - k_u)^2} \quad (70)$$

Now, collect terms with $E[j\upsilon]$, take the FT $\upsilon \to k_\upsilon$, integrate over $\alpha_u$ with $$\delta\left(\frac{\alpha_u - k_u}{2} + k_\upsilon\right)$$

yields $\alpha_u = k_u - 2k_\upsilon$ within $$\Gamma(\omega_o,\tau,k_u,k_\upsilon) = E[jk_u Y_1] \int d\omega_2 \Psi(\alpha'_x,k_u - 2k_\upsilon) \Psi^*(\beta'_x,-2k_\upsilon) \quad (71)$$

$$E[j\Delta x_1(\alpha'_x - \beta_x^o)] E[j\tau(\omega_o + 2\omega_2)] E\left[jk_u \frac{T_{off}}{2}\right]$$

where $$\alpha'_x = \sqrt{\left(\frac{2(\omega_c + \omega_o + \omega_2)}{C}\right)^2 - (k_u - 2k_\upsilon)^2} \quad (72)$$

and $$\beta'_x = \sqrt{\left(\frac{2(\omega_c + \omega_2)}{C}\right)^2 - (2k_\upsilon)^2}. \quad (73)$$

collect terms with $E[j\tau]$, take the FT $\tau \to \Theta$, integrate over $\omega_2$ with $$\delta\left(\omega_2 - \frac{\Theta - \omega_o}{2}\right)$$

$$\Gamma(\omega_o,\Theta,k_u,k_\upsilon) = E[jk_u Y_1] E[j\Delta x_1(\alpha''_x - \beta''_x)] E\left[jk_u \frac{T_{off}}{2}\right] * \quad (74)$$

$$\Psi(\alpha''_x,k_u - 2k_\upsilon) \Psi^*(\beta''_x,-2k_\upsilon)$$

where $$\gamma''_x = \sqrt{\left(\frac{(\Theta + \omega_c + \omega_o)}{C}\right)^2 - (k_u - 2k_\upsilon)^2} \quad (75)$$

and $$\beta''_x = \sqrt{\left(\frac{(\Theta + \omega_c - \omega_o)}{C}\right)^2 - (2k_\upsilon)^2}. \quad (76)$$

Defining new variable $$\zeta = \frac{k_u - 4k_\upsilon}{2} \quad (77)$$

we can, as in equation 44, recast equation 64 as a symmetric two spatial frequency correlation function:

$$\Gamma(\omega_o,\Theta k_u,k_\upsilon) = E[jK_1(k_u)] E[j\Delta x_1(\alpha''_x - \beta''_x)] E\left[jk_u \frac{T_{off}}{2}\right] * \quad (78)$$

$$\Psi\left(\alpha''_x, \frac{\zeta + k_u}{2}\right) \Psi^*\left(\alpha''_x, \frac{\zeta - k_u}{2}\right)$$

where $$\alpha''_x = \sqrt{\left(\frac{(\Theta + \omega_c + \omega_o)}{C}\right)^2 - \left(\zeta + \frac{k_u}{2}\right)^2} \quad (79)$$

and $$\beta''_x = \sqrt{\left(\frac{(\Theta + \omega_c + \omega_o)}{C}\right)^2 - \left(\zeta + \frac{k_u}{2}\right)^2}. \quad (80)$$

The inversion back to the estimate of the target region reflectivity function $\alpha(2x_1,2y_u)$, follows the general principles outlined in the monostatic case.

It should be clear to a practitioner versed in the art of the present invention, that the complex conjugate product of equations 26 and 55 can, without effect on the final system operation result, be recast in any combination of either symmetric or asymmetric form for both the temporal and/or the spatial lag dimensions:

$$\Gamma(t,\tau,u,\upsilon) = s_{mcb}(t+\tau,u+\upsilon) s^*_{mcb}(t-\tau,u-\upsilon) \quad (81)$$

or asymmetric in the spatial lag dimension with form $$\Gamma(t,\tau,u,v;T) \equiv s_{mcb}(t+\tau, u+T)s^*_{mcb}(t-\tau, u+T-v) \quad ((82)$$

Moreover, many temporal/spatial operations described in the present invention can be alternatively performed in the frequency domains and vice versa, and that the position of several of the phase correcting steps within the processing chain can be reassigned without affecting the final reduced wavenumber characteristic of the present invention.

What is claimed is:

1. A target imaging method comprising:
   a) converting multi-frequency radiant energy echoes received at a plurality of locations from at least one target in a region into multi-dimensional digital echo signals with at least one temporal variable and at least one pair of spatial variables;
   b) performing a complex conjugate product on the digital echo signals to produce interferometric data;
   c) performing a multi-dimensional Fourier Transform on the interferometric data to produce intermediate data with at least one spectral variable and at least two wavenumber variables;
   d) phase correcting the intermediate data;
   e) performing an interpolation on the intermediate data to produce secondary data having at least three wavenumber variables;
   f) performing an inverse multi-dimensional Fourier Transform on the secondary data to produce spatial correlation data with at least one pair of spatial variables; and
   g) processing the spatial correlation data to produce final spatial image data corresponding to the at least one target by collapsing the correlation data of each pair of spatial data variables to one spatial variable.

2. The method according to claim 1, wherein each pair of spatial variables has a spatial translation variable and a spatial lag variable.

3. The method according to claim 1, wherein simulated digital echo data representative of a known position virtual target is added to the digital echo data prior to performing the complex position conjugate product and simulated spatial image data representative of said virtual target is subtracted from final spatial image data.

4. The method according to claim 2, wherein the complex conjugate product is performed in either symmetric or asymmetric form with respect to at least one of a spatial lag variable and a temporal variable.

5. The method according to claim 2, wherein the complex conjugate product is performed with respect to the spatial lag variable, the multi-dimensional Fourier Transform is performed in three dimensions, a single spatial correlation pair is collapsed to a remaining spatial variable and wherein the processing step further comprises performing an inverse Fourier Transform on the remaining spatial variable of the collapsed data to produce the final spatial image data.

6. The method according to claim 2, wherein the complex conjugate product is performed with respect to a spatial lag variable and with respect to a temporal lag variable, the multi-dimensional Fourier Transform is performed in four dimensions, the interpolation is performed on one pair of spectral and one pair of wavenumber variables to produce secondary wavenumber data with two pairs of wavenumber variables, the inverse multi-dimensional Fourier Transform produces two pairs of spatial correlation data, and two pairs of spatial correlation variables are collapsed.

7. A target imaging system comprising:
   a) means for converting multi-frequency radiant energy echoes received at a plurality of locations from at least one target in a region into multi-dimensional digital echo signals with at least one temporal variable and at least one pair of spatial variables;
   b) means for performing a complex conjugate product on the digital echo signals to produce interferometric data;
   c) means for performing a multi-dimensional Fourier Transform on the interferometric data to produce intermediate data with at least one spectral variable and at least two wavenumber variables;
   d) means for phase correcting the intermediate data;
   e) means for performing an interpolation on the intermediate data to produce secondary data having at least three wavenumber variables;
   f) means for performing an inverse multidimensional Fourier Transform on the secondary data to produce spatial correlation data with at least one pair of spatial variables; and
   g) means for processing the spatial correlation data to produce final spatial image data corresponding to the at least one target comprising means for collapsing the correlation data of each pair of spatial data variables to one spatial variable.

8. The system according to claim 7, wherein each pair of spatial variables has a spatial translation variable and a spatial lag variable.

9. The system according to claim 7, further comprising means for adding simulated digital echo data representative of a known position virtual target to the digital echo data prior to performing the complex position conjugate product and means for subtracting simulated spatial image data representative of said virtual target from final spatial image data.

10. The system according to claim 8, wherein the means for performing the complex conjugate product performs same in either symmetric or asymmetric form with respect to at least one of a spatial lag variable and a temporal variable.

11. The system according to claim 8, wherein the means for performing the complex conjugate product performs same with respect to the spatial lag variable, the means for performing the multi-dimensional Fourier Transform performs same in three dimensions, the means for collapsing collapses a single spatial correlation pair to a remaining spatial variable and wherein the processing means further comprises means for performing an inverse Fourier Transform on the remaining spatial variable of the collapsed data to produce the final spatial image data.

12. The system according to claim 8, wherein the means for performing the complex conjugate product performs same with respect to a spatial lag variable and with respect to a temporal lag variable, the means for performing the multi-dimensional Fourier Transform performs same in four dimensions, the means for performing the interpolation performs same on one pair of spectral and one pair of wavenumber variables to produce secondary wavenumber data with two pairs of wavenumber variables, the means for performing the inverse multi-dimensional Fourier Transform produces two pairs of spatial correlation data, and the means for collapsing collapses two pairs of spatial correlation variables.

* * * * *